UNITED STATES PATENT OFFICE.

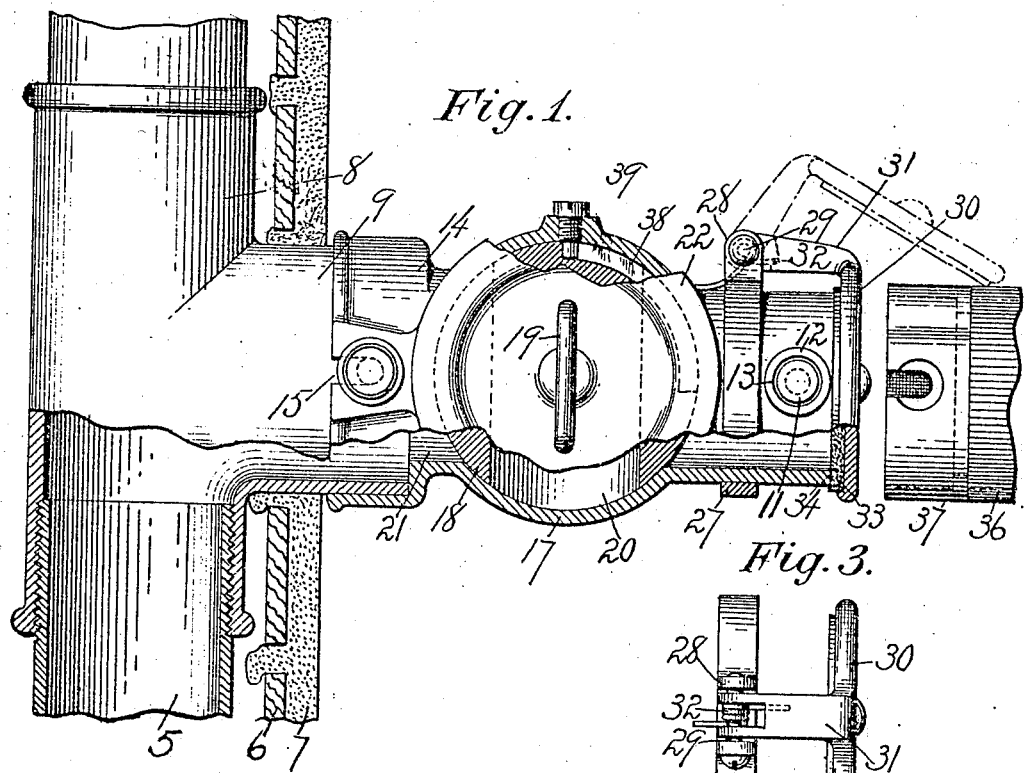
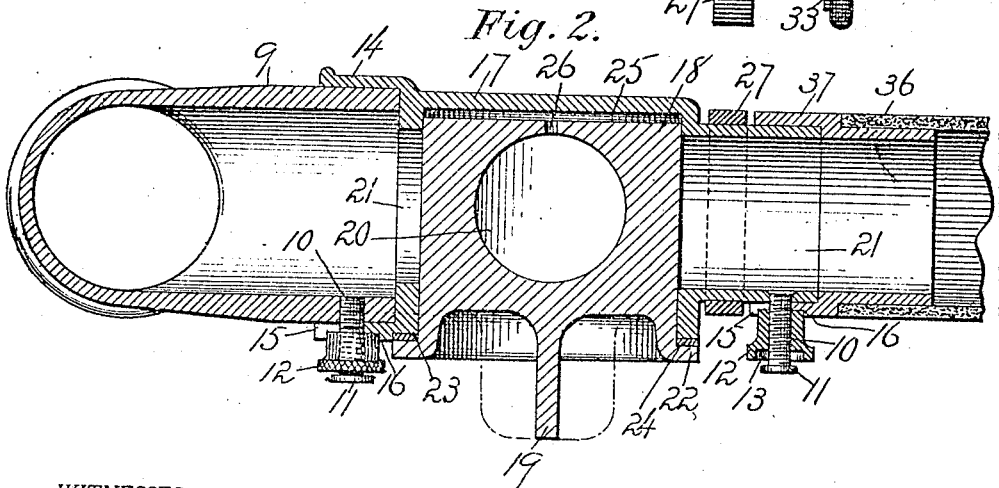

IRA H. SPENCER, OF HARTFORD, CONNECTICUT, ASSIGNOR TO THE SPENCER TURBINE CLEANER COMPANY, OF HARTFORD, CONNECTICUT, A CORPORATION OF CONNECTICUT.

CONNECTION FOR PNEUMATIC APPARATUS.

968,810.      Specification of Letters Patent.     Patented Aug. 30, 1910.

Application filed December 23, 1907. Serial No. 407,645.

*To all whom it may concern:*

Be it known that I, IRA H. SPENCER, a citizen of the United States, and a resident of Hartford, in the county of Hartford and State of Connecticut, have invented a new and Improved Connection for Pneumatic Apparatus, of which the following is a specification.

My invention relates to the class of devices specified, and the object of my invention is to provide a device of this class having novel features of advantage and utility.

A form of device in the use of which this object may be obtained is illustrated in the accompanying drawings, in which—

Figure 1 is a view in elevation of a portion of a pneumatic tube showing my improvement applied thereto, parts being broken away to show construction. Fig. 2 is a view in central longitudinal section through a connection embodying my invention. Fig. 3 is a view of the mouth valve and its mount.

In the accompanying drawings the numeral 5 indicates a tube arranged for conveying a current of air, this tube being arranged in any suitable position, as within a wall including lath 6 and plastering 7. A T 8 is attached to this tube, the branch 9 of which projects through the wall in proper position for attachment of hose or devices to receive a hose.

My device is especially applicable to pneumatic cleaning apparatus, in which the air currents are created by suction, the air being taken in through the hose or like parts connected with the branch 9. In such cleaning devices it is desirable to use different sizes of hose, depending upon the length of hose employed for cleaning purposes. To accomplish this the branch 9 is provided with a stud 10 having a head 11. A locking nut 12 is located upon the stud, this locking nut having a recess 13 for the reception of the head 11 of the stud, this head preventing disengagement of the nut from the stud.

A removable tip 14 has a slot 15 terminating in a recess 16. The slot is of a size to receive the stud 10 but is less in width than the diameter of the base of the nut, the latter fitting the recess. This provides a secure lock for the removable tip, and one quickly and readily manipulated to engage and disengage the parts. This removable tip includes, in the form of device herein shown, a valve body 17 in which a valve 18 is located. This valve has a handle or like part 19 which is employed for manipulating the valve. An opening 20 is formed through the valve which is adapted to register with the openings 21 in the tip on each side of the valve chamber. The valve is provided with a flange 22 overlying a valve seat 23 on the valve body at the outer surface. A packing 24 is located upon the valve seat 23 to insure the tightness of the joint at this point.

The valve 18 terminates at its inner end short of the end of the valve chamber, this leaving a space 25 between the inner end of the valve and the wall of the valve body. A port 26 extends from the opening 20 into this recess or chamber 25. It will be seen from this construction that as air is drawn through the device by suction this port and chamber will permit action of the air to draw the valve closely to its seat 23.

A ring 27 is mounted upon the removable tip near its outer end, this ring being so constructed that it may be readily adjusted in its position upon the tip. It is split on one side, ears 28 being located on opposite sides of the split portion, and a bearing screw 29 projects through the ears.

By loosening or tightening the screw it will be seen that the band or ring 27 is readily loosened or tightened for purposes of adjustment or otherwise upon the end of the tip.

A valve 30 has a shank 31, the end of which is mounted upon the screw 29. A spring 32 is employed to force the valve toward its closed position. This shank 31 is of considerable length and even without the spring 32 it will be seen that when the valve is placed in a certain position it will close by the action of gravity. The spring, however, is employed to certainly throw the valve to a position from which it may act under the influence of gravity.

By adjusting the band or ring 27 along the tip the packing 33 on the valve may be caused to accurately engage the valve seat 34 on the end of the tip, thus preserving the valve tight at this point.

A stud 10, nut 12 and other parts as hereinbefore described are located at this end of the tip for the attachment of a hose or like part 36. The end of the hose is provided with a metallic ring 37 having the slot and recess for the reception of the stud and nut as hereinbefore described.

It will be seen that from this construction a hose of a certain size having the ring 37 may be attached directly to the branch 9, or if a smaller hose is required, depending upon the length which is used, the removable tip being inserted in position such smaller hose is readily attached thereto.

A recess 38 is formed in the valve 18, extending along the surface and a pin 39 projecting through the valve body with its inner end located in this recess determines the degree of movement of the valve.

The valve 30 is so constructed that it is impossible to leave it open after a hose has been disconnected therefrom. Should such valve be left open the inconvenience may be readily imagined where a system is installed in a building of several stories, as much time will be required to locate the open mouth. Such opening, of course, might affect the working of the apparatus.

In the use of the device in stores or other places where frequent use is required, the valve 18 is of especial advantage as the passage through the tip may be closed before the valve 30 is opened, thus preventing objectionable noise as the air passes in at the mouth, which noise will result should the passage through the tip remain open.

In order to attach a hose to the removable tip it is necessary that the bearing for the valve 30 shall be located at some distance from the end or mouth, and the ring 27 provides such bearing. The arm 31 extending from the valve provides means whereby the valve may be raised so as not to obstruct the attachment of the hose to the tip.

I claim:

1. A tube arranged for the passage of fluid and having a mouth opening therefrom, a valve arranged to close said mouth, means for supporting the valve, means for adjusting the position of said support in a direction practically the same as that of the seating and unseating movement of the valve and a shank extending from the valve in a direction laterally of the plane of the valve seat and secured to said support.

2. A tube arranged for the passage of fluid and having a mouth forming a valve seat located in a plane at right-angles to the axis of that part of the tube upon which said seat is located, a band adjustable along said tube in a direction practically the same as the direction of seating and unseating movements of the valve, a valve adapted to close the mouth into the tube and a shank extending from the valve in a direction laterally of the plane of said valve seat, said shank being pivotally attached to said band.

3. A tube arranged for the passage of fluid and having a mouth forming a valve seat in a plane at right-angles to the axis of that part of the tube upon which said seat is located, a split ring mounted upon said tube, a valve adapted to close the mouth of the tube and a shank extending from the valve in a direction laterally of the plane of said valve seat, said shank being pivotally attached to said ring.

4. A pipe arranged for the passage of fluid and having a mouth forming a valve seat, a split ring formed of a single piece mounted on the pipe, a single pivot arranged to close the ends of the ring together, a valve arranged to close the mouth into the tube and a shank extending from the valve in a direction laterally of the plane of said valve seat, said shank being pivotally attached to said ring.

5. A tube arranged for the passage of fluid and having a mouth opening therefrom and forming a valve seat, a valve arranged to close said mouth, a shank extending from the edge of the valve in a direction practically parallel with the axis of the pipe when the valve is closed, a support mounted upon the pipe, and means for pivotally attaching said shank to said support.

6. A tube arranged for passage of fluid and having a mouth opening therefrom forming a valve seat, a valve arranged to close said mouth, a shank extending from the edge of said valve practically parallel with the axis of said pipe when the valve is closed, a support located upon the pipe, means for pivotally attaching said shank to said support, and means located between the support and the end of the pipe for attachment of a hose.

IRA H. SPENCER.

Witnesses:
MAY C. CARROLL,
ARTHUR P. DAY.